United States Patent
Goodson

(10) Patent No.: US 10,628,215 B2
(45) Date of Patent: *Apr. 21, 2020

(54) MULTI-THREADED PROCESSING OF USER INTERFACES FOR AN APPLICATION

(71) Applicant: FACEBOOK, INC., Menlo Park, CA (US)

(72) Inventor: Scott Paul Goodson, Emerald Hills, CA (US)

(73) Assignee: FACEBOOK, INC., Menlo Park, CA (US)

( * ) Notice: Subject to any disclaimer, the term of this patent is extended or adjusted under 35 U.S.C. 154(b) by 128 days.

This patent is subject to a terminal disclaimer.

(21) Appl. No.: 15/717,031

(22) Filed: Sep. 27, 2017

(65) Prior Publication Data

US 2018/0018200 A1  Jan. 18, 2018

Related U.S. Application Data

(63) Continuation of application No. 14/495,816, filed on Sep. 24, 2014, now Pat. No. 9,798,581.

(51) Int. Cl.
*G06F 9/48* (2006.01)

(52) U.S. Cl.
CPC ...... *G06F 9/4881* (2013.01); *G06F 2209/509* (2013.01)

(58) Field of Classification Search
None
See application file for complete search history.

(56) References Cited

U.S. PATENT DOCUMENTS

| 2003/0144789 A1* | 7/2003 | Le Gall | F02D 37/02 701/105 |
| 2014/0201673 A1 | 7/2014 | Dunn | |
| 2014/0250393 A1 | 9/2014 | Goodson | |

OTHER PUBLICATIONS

*Hacker Way: Mobile Engineering at Facebook's Scale*, May 1, 2014, youtu.be/TCuVxU07NWs?t=25m54s, 1 pg.

(Continued)

*Primary Examiner* — Eric C Wai
(74) *Attorney, Agent, or Firm* — Morgan, Lewis & Bockius LLP

(57) ABSTRACT

An electronic device processes tasks in an application program on a first thread; creates, by the first thread, one or more additional threads distinct from the first thread; and partially processing a plurality of layout objects in the application program on the one or more additional threads. In accordance with a determination that one or more thread-control criteria are satisfied, the processing of the plurality of layout objects in the application program on the one or more additional threads is paused and control of processing the application program is given to the first thread, which processes additional tasks in the application program. After the additional tasks are processed, the processing of the plurality of layout objects resumes on the one or more additional threads.

17 Claims, 11 Drawing Sheets

(56) References Cited

OTHER PUBLICATIONS

*Building Asynchronous User Interfaces: Keeping Gestures & Animations Smooth—Building Paper*, Apr. 18, 2014, youtu.be/0bDRpw5v2Ms, 1 pg.
Published as US2014/250393 A1 (See Above) Patent Application entitled "Techniques for Asynchronous Rendering," Docket No. 1360F0004, 37 pgs.
Goodson, Office Action, U.S. Appl. No. 14/495,816, dated Jan. 12, 2017, 9 pgs.
Goodson, Notice of Allowance, U.S. Appl. No. 14/495,816, dated Jun. 27, 2017, 13 pgs.

\* cited by examiner

MULTI-THREADED PROCESSING OF USER INTERFACES FOR AN APPLICATION

RELATED APPLICATION

This application is a continuation of U.S. Non-Provisional application Ser. No. 14/495,816, filed Sep. 24, 2014, entitled "Multi-Threaded Processing of User Interfaces for an Application," which application is incorporated by reference in its entirety.

TECHNICAL FIELD

This relates generally to multi-threaded processing in a computer system, including but not limited to multi-threaded processing of user interfaces for software applications.

BACKGROUND

The proliferation of mobile devices with touch screens has led to new and exciting opportunities in application development. The combination of touch input, specifics of mobile device hardware, and user experience considerations has inspired many ideas for practical mobile applications that are easy to use.

But the limitations of mobile device hardware (e.g., limited computing power) have created challenges to implementing these ideas. Examples of such challenges include lag in the user interfaces of these applications, such as delays between user inputs and graphical outputs in response to the user inputs, and unsmooth animations.

SUMMARY

Accordingly, there is a need for methods, devices, and computer readable storage media, with faster, more efficient ways to process tasks in software applications. Such methods and interfaces optionally complement or replace conventional methods for processing tasks in software applications.

In accordance with some embodiments, a method is performed at an electronic device with a display, one or more processors, and memory storing one or more programs for execution by the one or more processors. The method includes: processing tasks in an application program; at least partially processing a plurality of layout objects in the application program; in accordance with a determination that one or more predefined control criteria are satisfied, pausing the processing of the plurality of layout objects in the application program; while the processing of the plurality of layout objects in the application program is paused, processing system tasks; and, after processing the system tasks while the processing of the plurality of layout objects in the application program is paused, resuming the processing of the plurality of layout objects.

In accordance with some embodiments, an electronic device includes a display, one or more processors and memory storing one or more programs. The one or more programs are configured to be executed by the one or more processors and the one or more programs include instructions for performing the operations of the method described above. In accordance with some embodiments, a computer readable storage medium has stored therein instructions, which, when executed by an electronic device with a display and one or more processors, cause the device to perform the operations of the method described above. In accordance with some embodiments, an electronic device includes a display and means for performing the operations of the method described above.

Thus, electronic devices are provided with faster, more efficient methods for processing tasks in an application program, thereby increasing the effectiveness, efficiency, and user satisfaction with such systems. Such methods may complement or replace conventional methods for processing tasks using multiple threads.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DESCRIPTION OF EMBODIMENTS

When a user interface for an application includes a large number of user interface elements, processing the large number of user interface elements can stall the main thread, leading to delays in responding to user inputs and updating the display, which are not desirable for satisfactory user experience. Existing methods rely on more powerful hardware to reduce this problem.

As described below, delays in responding to user inputs and updating the display are reduced by breaking the application into a group of smaller tasks and responding to the user inputs and updating the display between processing of the smaller tasks.

In addition, some operating systems (e.g., certain mobile operating systems) require that particular user interface elements be processed exclusively in a single thread (e.g., a main thread).

As described below, stalls in the main thread are reduced here by offloading the tasks from the main thread and processing the tasks on one or more background threads. But computationally intensive tasks (e.g., decoding photographic images) on the background threads can also cause delays in the main thread (e.g., the main thread may not be given control until the tasks on the background threads are completed), leading to delays in responding to user inputs and updating the display. Better use of the main thread and the background threads is achieved here by pausing the background threads and giving control to the main thread when predefined background-thread-to-main-thread-control criteria are met. This ensures that time-critical tasks are processed by the main thread, while allowing the use of the backgrounds thread to unload tasks from the main thread. This reduces delays in processing and presenting user interfaces for an application.

Figure 1:
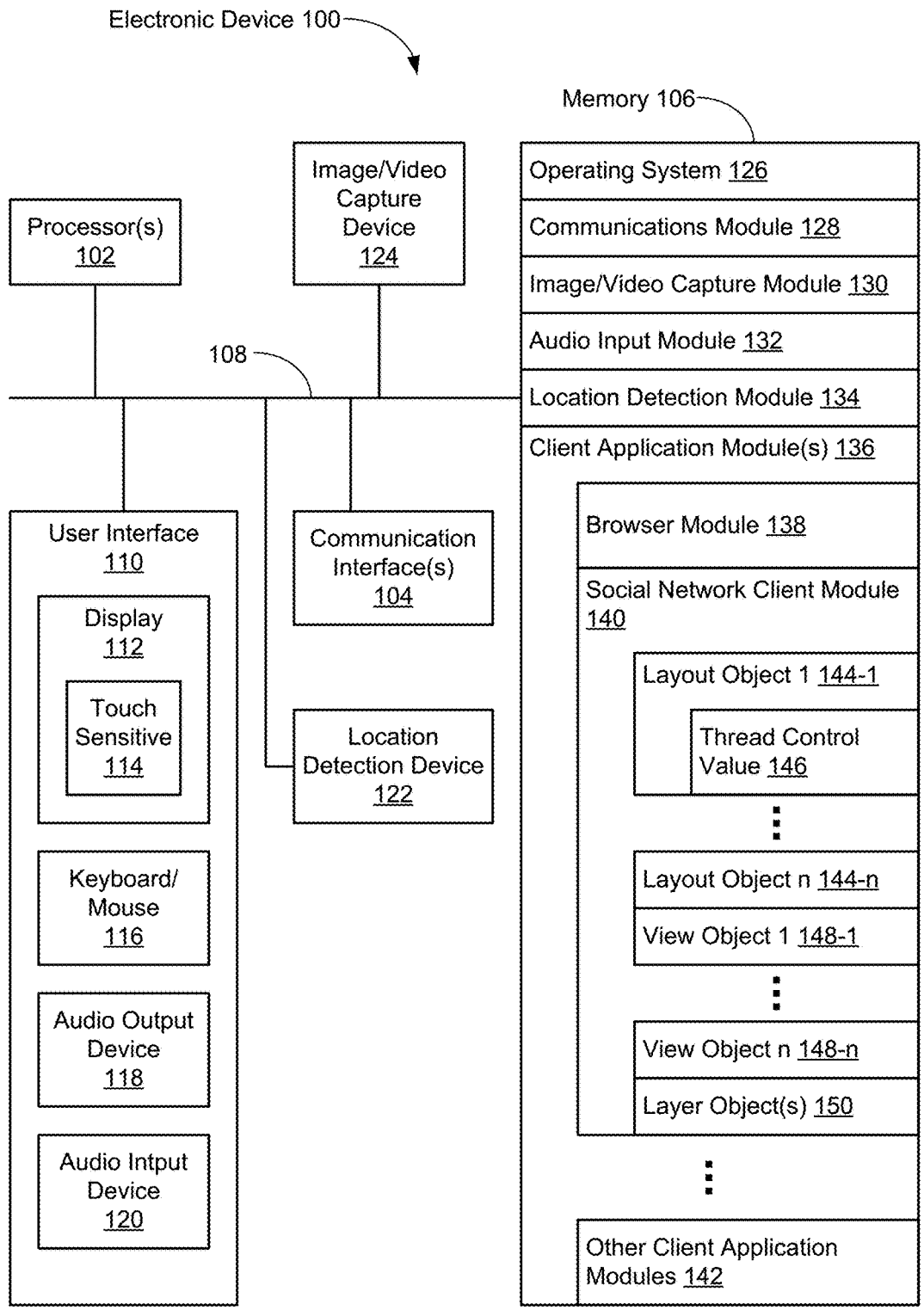
FIG. 1 is a block diagram illustrating an exemplary electronic device in accordance with some embodiments.
Figure 2:
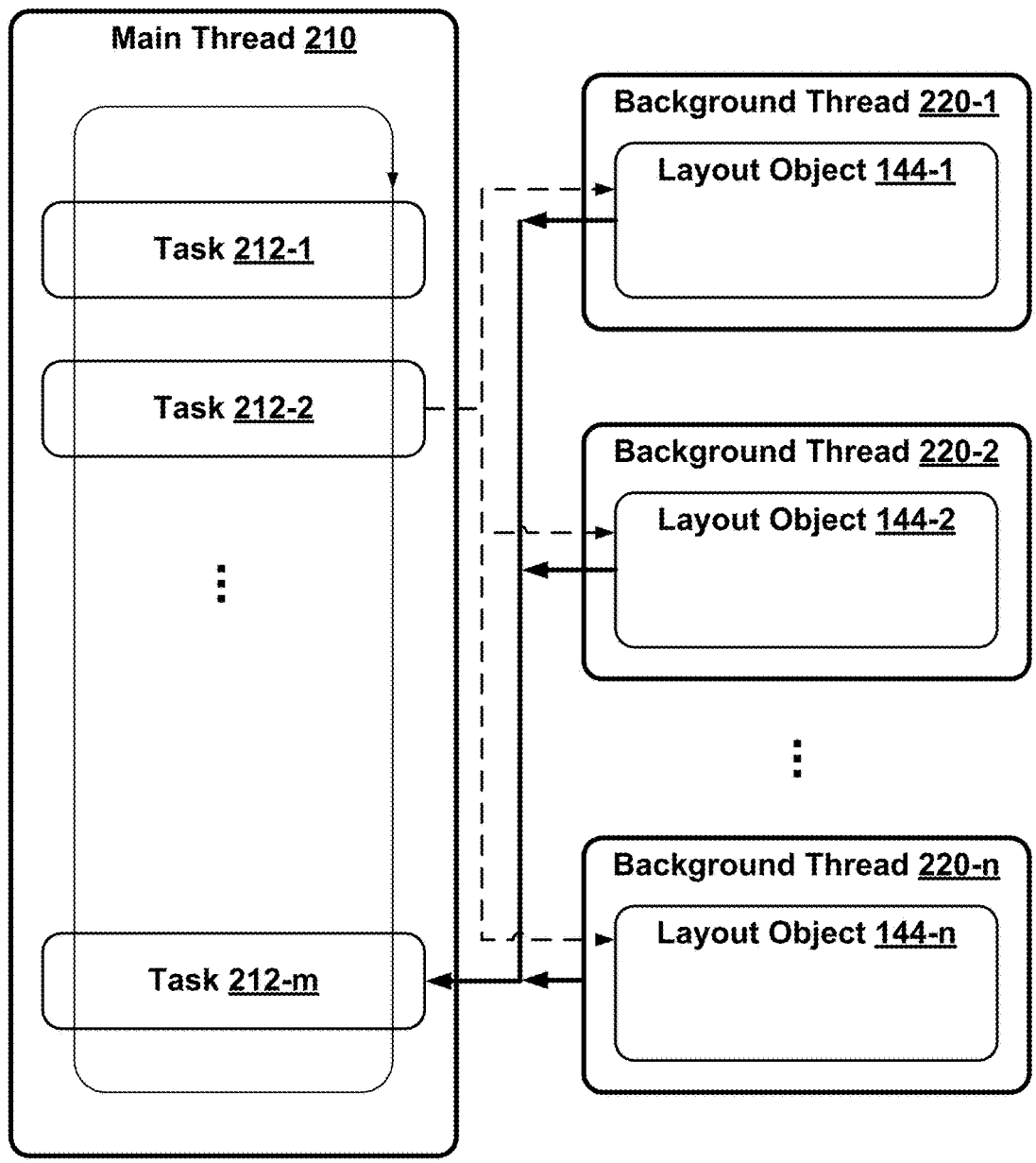
FIG. 2 is a block diagram illustrating multi-threaded operations in accordance with some embodiments.
Figure 3:
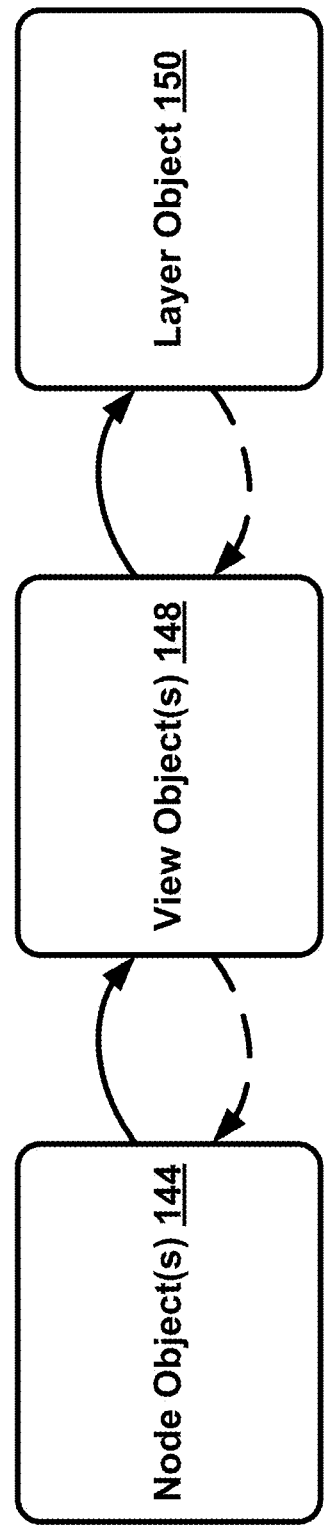
FIG. 3 is a block diagram illustrating display objects in accordance with some embodiments.
Figure 4A:
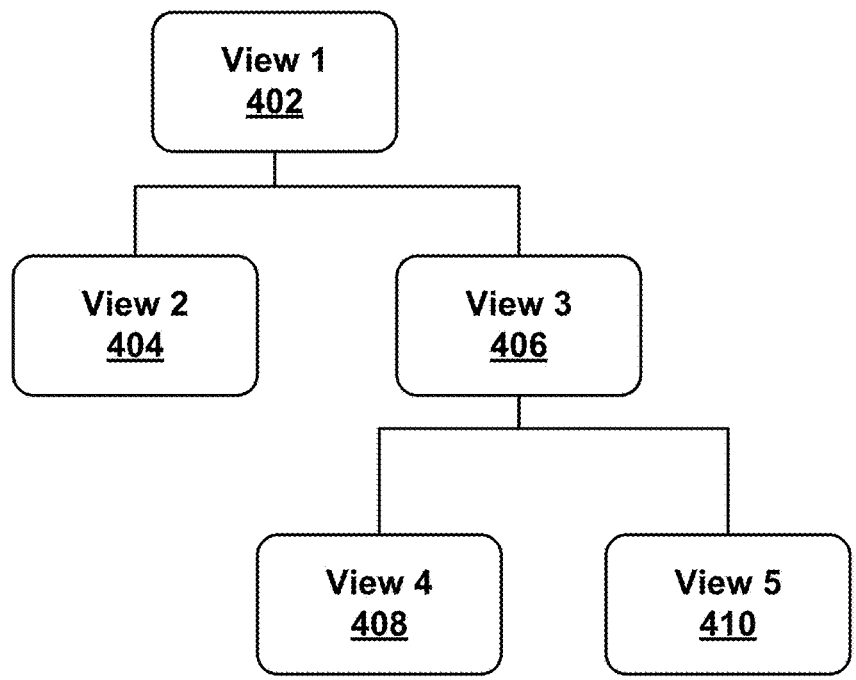
FIG. 4A is a block diagram illustrating a view hierarchy in accordance with some embodiments.
Figure 4B:
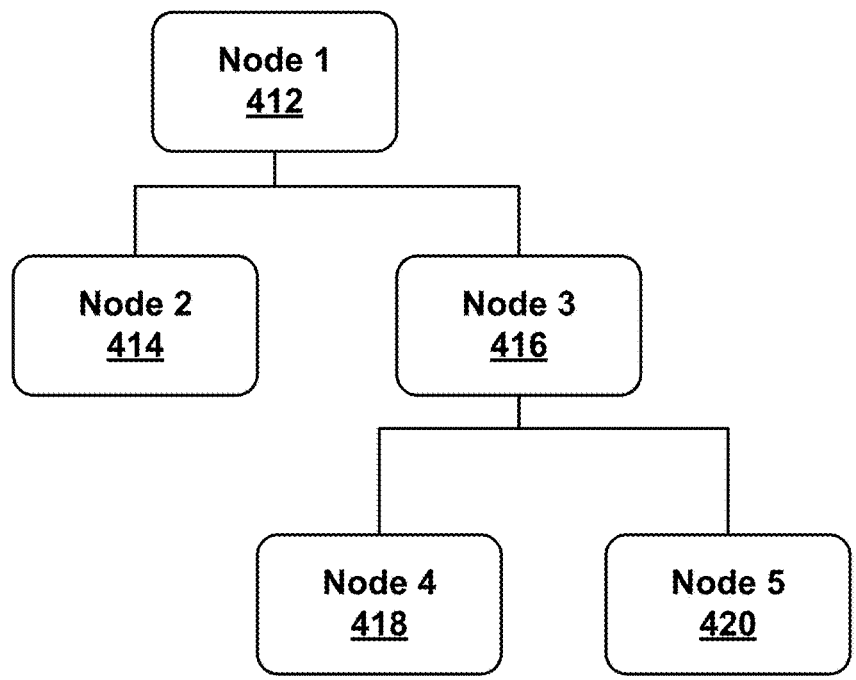
FIG. 4B is a block diagram illustrating a node hierarchy that corresponds to the view hierarchy in FIG. 4A.
Figure 6:
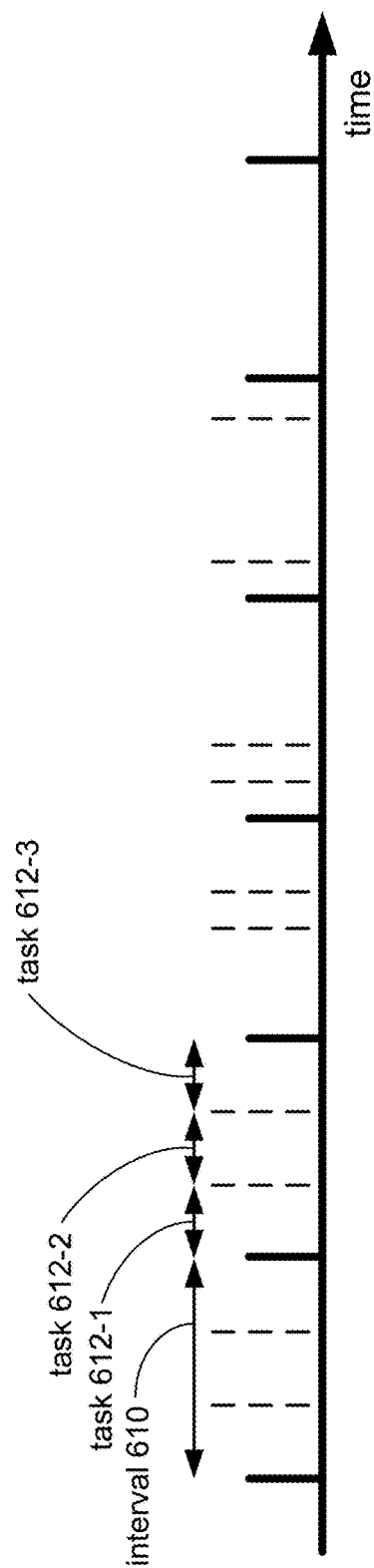
FIG. 6 is a timing diagram illustrating multi-threaded operations in accordance with some embodiments.
Figure 7A:
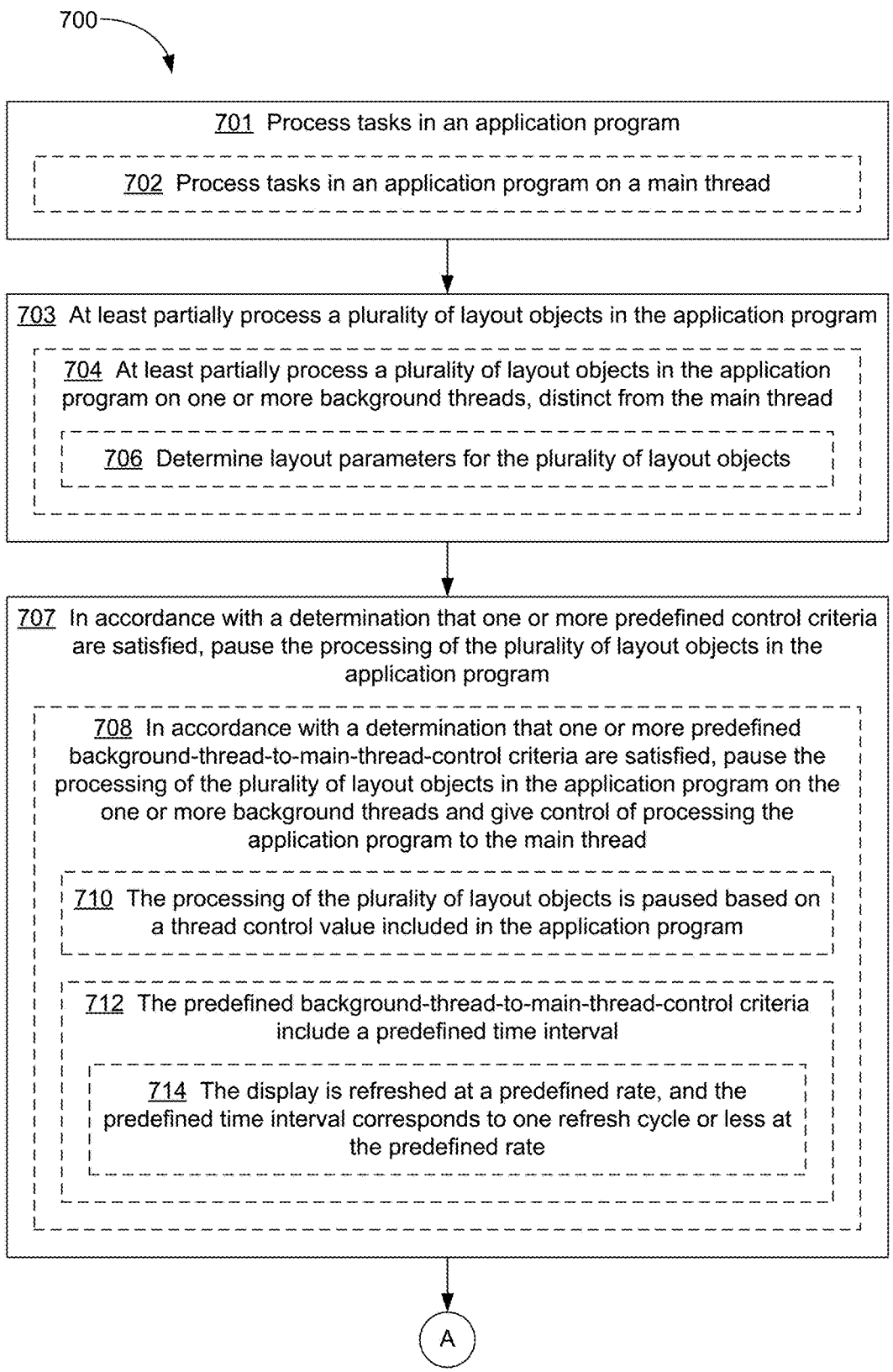
FIGS. 7A-7B are flow diagrams illustrating a method of processing tasks using multiple threads on an electronic device in accordance with some embodiments.
Figure 7B:
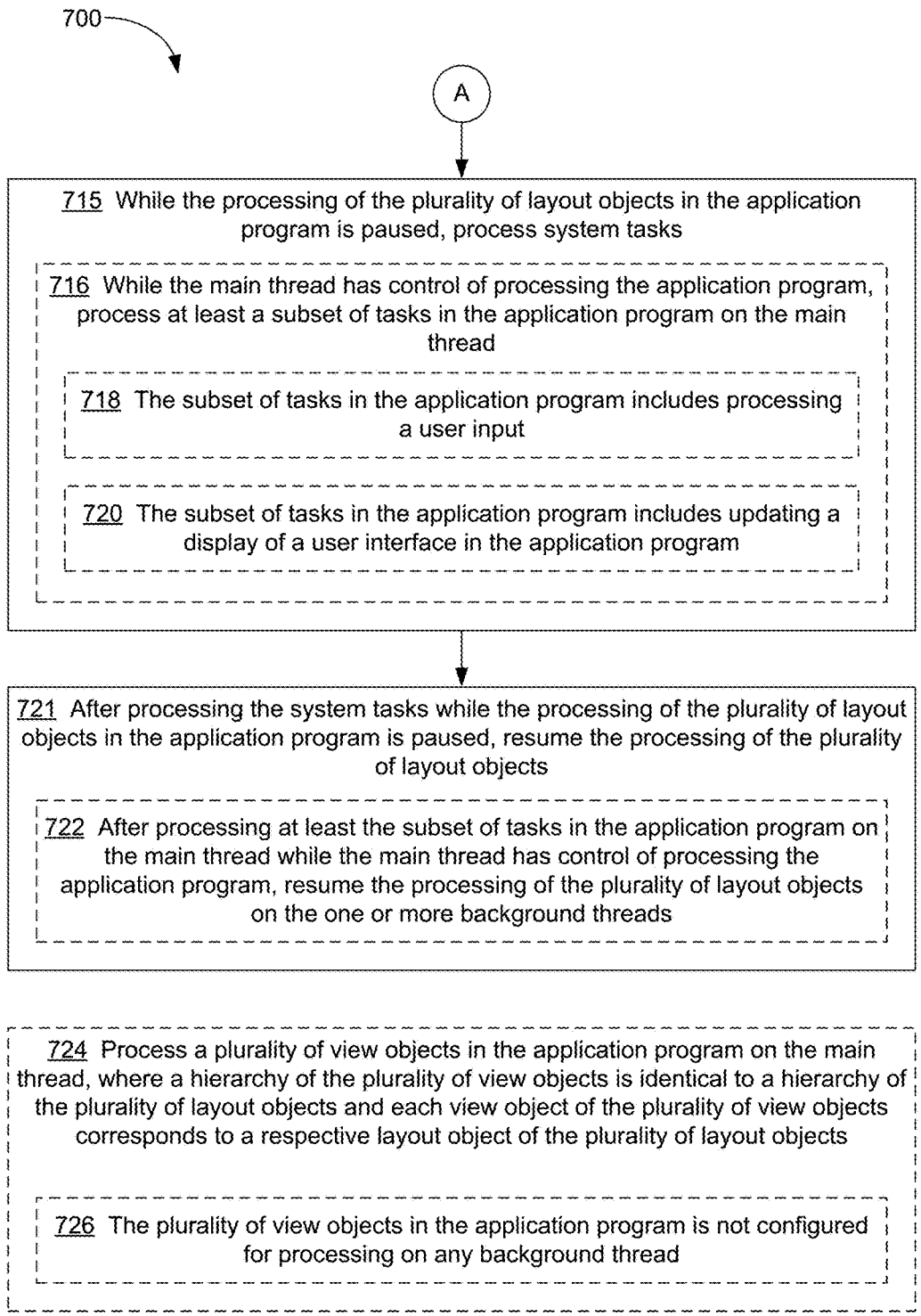

Below, FIG. 1 provides a description of an example electronic device in which tasks are processed using multiple threads. FIG. 2 illustrates example threads of a multi-threaded application. FIG. 3 illustrates exemplary display objects in a multi-threaded application. FIGS. 4A-4B illustrate exemplary view and node hierarchies for display objects. FIGS. 5A-5D illustrate an exemplary user interface of an application and corresponding user interface elements, views, view hierarchy, and node hierarchy. FIG. 6 is a timing diagram of multi-threaded operations. FIGS. 7A-7B are flow diagrams illustrating a method of processing tasks in multi-threaded applications. The diagrams in FIGS. 2-6 are used to illustrate the processes in FIGS. 7A-7B.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first processor could be termed a second processor, and, similarly, a second processor could be termed a first processor, without departing from the scope of the various described embodiments. The first processor and the second processor are both processors, but they are not the same processor.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

FIG. 1 is a block diagram illustrating an exemplary electronic device 100 in accordance with some embodiments. The electronic device 100 typically includes one or more processing units (processors or cores) 102, one or more network or other communications interfaces 104, memory 106, and one or more communication buses 108 for interconnecting these components. The communication buses 108 optionally include circuitry (sometimes called a chipset) that interconnects and controls communications between system components. The electronic device 100 includes a user interface 110. The user interface 110 typically includes a display device 112. For clarity, user interface 110 of the device is distinct from the user interfaces of an application, although the user interfaces of an application are displayed on display device 112 of user interface 110 of the device. In some embodiments, the electronic device includes inputs such as a keyboard, mouse, and/or other input buttons 116. Alternatively or in addition, in some embodiments, the display device 112 includes a touch-sensitive surface 114, in which case the display device 112 is a touch-sensitive display. In electronic devices that have a touch-sensitive display 112, a physical keyboard is optional (e.g., a soft keyboard may be displayed when keyboard entry is needed). The user interface 110 also includes an audio output device 118, such as speakers or an audio output connection connected to speakers, earphones, or headphones. Furthermore, some electronic devices 100 use a microphone and voice recognition to supplement or replace the keyboard. Optionally, the electronic device 100 includes an audio input device 120 (e.g., a microphone) to capture audio (e.g., speech from a user). Optionally, the electronic device 100 includes a location detection device 122, such as a GPS (global positioning satellite) or other geo-location receiver, for determining the location of the electronic device 100. The electronic device 100 also optionally includes an image/video capture device 124, such as a camera or webcam.

Memory 106 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 106 may optionally include one or more storage devices remotely located from the processor(s) 102. Memory 106, or alternately the non-volatile memory device(s) within memory 106, includes a non-transitory computer readable storage medium. In some embodiments, memory 106 or the computer readable storage medium of memory 106 stores the following programs, modules and data structures, or a subset or superset thereof:

- an operating system 126 that includes procedures for handling various basic system services and for performing hardware dependent tasks;
- a network communication module 128 that is used for connecting the electronic device 100 to other computers via the one or more communication network interfaces 104 (wired or wireless) and one or more communication networks, such as the Internet, cellular telephone networks, mobile data networks, other wide area networks, local area networks, metropolitan area networks, and so on;

an image/video capture module 130 (e.g., a camera module) for processing a respective image or video captured by the image/video capture device 124, where the respective image or video may be sent or streamed (e.g., by a client application module 136) to a remote computer system;

an audio input module 132 (e.g., a microphone module) for processing audio captured by the audio input device 120, where the respective audio may be sent or streamed (e.g., by a client application module 136) to a remote computer system;

a location detection module 134 (e.g., a GPS, Wi-Fi, or hybrid positioning module) for determining the location of the electronic device 100 (e.g., using the location detection device 122) and providing this location information for use in various applications (e.g., social network client module 140); and one or more client application modules 136, including the following modules (or sets of instructions), or a subset or superset thereof:

a web browser module 138 (e.g., Internet Explorer by Microsoft, Firefox by Mozilla, Safari by Apple, or Chrome by Google) for accessing, viewing, and interacting with web sites (e.g., a social networking web site such as www.facebook.com), a social network client module 140 for providing an interface to a social network (e.g., a social network provided by a social network system) and related features (e.g., display postings by users who are connected to a user of the electronic device 100 in the social network system); and/or other optional client application modules 142, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

In some embodiments, the social network client module 140 or any application module of the client application modules 136 includes one or more layout objects 144 (e.g., layout object 1 (144-1) through layout object n (144-*n*)). In some embodiments, a respective layout object, such as layout object 1 (144-1), includes a thread control value 146. In some embodiments, the thread control value indicates whether processing of the respective layout object (e.g., layout object 1 (144-1)) is to be suspended in accordance with background-thread-control-timing criteria (e.g., a predefined time interval). In some embodiments, a layout object has a corresponding view object.

In some embodiments, the social network client module 140 or any application module of the client application modules 136 includes one or more view objects 148 (e.g., view object 1 (148-1) through view object n (148-*n*)). In some embodiments, a view object is an instance of a view class. In some embodiments, a view object defines a region of a predefined shape (e.g., rectangle, circle, triangle, pentagon, star, etc.) on the display and handles graphics and user inputs in the region of the predefined shape.

In some embodiments, the social network client module 140 or any application module of the client application modules 136 includes one or more layer objects 150. In some embodiments, a layer object is an instance of a layer object. In some embodiments, a layer object manages image-based content in a corresponding display layer. In some embodiments, the layer object is associated with one or more view objects (e.g., the layer object includes one or more view objects).

The one or more layout objects 144, the one or more view objects 148, and the one or more layer objects 150 are described below with respect to FIG. 2.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 106 stores a subset of the modules and data structures identified above. Furthermore, memory 106 optionally stores additional modules and data structures not described above.

FIG. 2 is a block diagram illustrating multi-threaded operations in accordance with some embodiments. FIG. 2 illustrates a main thread 210 of an application module (e.g., social network client module 140).

As used herein, a thread refers to a sequence of tasks identified for sequential execution. For example, a thread may include a single chain of sequentially executing commands, elements, subroutines, or other programming structures. An application module may operate on a single thread, which is referred to herein as the main thread 210 of the application. In some embodiments, the main thread 210 has special significance or particular privilege as compared to other threads, based on an operating system or library (e.g., operating system 126). In some embodiments, the main thread 210 of an application module 136 is configured to create one or more additional threads in order to perform tasks in parallel with the main thread 210. For example, the additional threads may be used to perform computation for the application module 136 while the main thread 210 primarily waits to receive interrupts from an operating system, such as from user input being received.

The additional threads may be created according to any known technique. For example, the additional threads may include one or more long-term threads maintained over the life of a particular run of the application module, the long-term threads waking to perform calculations when passed tasks from the main thread or other threads. The threads may include one or more short-term threads instantiated for the performance of a particular task and then deallocated when their respective task is complete. In some embodiments, the main thread 210 or another thread defines a contained task—such as a function, procedure call, or other programming element combined with one or more objects, data structures, or other data containers—and submits the task to a centralized operating system clearinghouse for execution. The clearinghouse queues, executes the task using a thread, and returns the result to the submitting thread.

Multiple tasks 212-1 thru 212-*m* are processed on the main thread. The tasks 212 include various operations related to the operation of the application module, including, for example, processing user inputs, rendering, image decoding, and so on. The main thread 210, when one task 212-1 is completed, starts processing another task 212-2. In some embodiments, the main thread 210, whenever a task is completed, checks the set of tasks 212 awaiting processing and selects another one to start. In some embodiments, the selection is based on the priority of the task; for example, processing user input has higher priority than determining the dimensions of a user interface element.

In some embodiments, one or more layer objects (e.g., layer object(s) 150, FIG. 1) are associated with the application module. The layer object is used for managing the displaying of visual content (e.g., graphics, user interfaces, animations, etc.). In some embodiments, a layer object manages information about the appearance of the visual content. In some embodiments, the layer object manages the state of what is displayed at the current moment. In some embodiments, when an animation is triggered, the state information held by the layer object is manipulated in accordance with the trigger to display the animation, and the layer object is updated with the current state information after the animation.

In some embodiments, the layer object 150 is required by the operating system 126 for processing on the main thread 210. Thus, the tasks 212 in the main thread 210 include tasks for processing the layer object 150 (e.g., displaying a corresponding layer).

In some embodiments, a respective layout object (e.g., any of 144-1 through 144-n) is created (instantiated) for handling graphics in a corresponding view (e.g., determining a layout within the view). The layout objects 144 are not required to be processed on the main thread 210, and thus can be processed on background threads 220. By processing the layout objects 144 on the background threads 220, progress in the main thread 210 is less likely to be hindered when processing of the layout objects 144 takes a relatively long time (e.g., for decoding photographic images). For example, a task 212-2 initiates processing of layout objects 144, and each layout object 144 is processed in a background thread 220. For example, the layout object 144-1 is processed in the background thread 220-1, the layout object 144-2 is processed in the background thread 220-2, and so on. In some embodiments, multiple layout objects are processed on a single background thread.

In some embodiments, when processing of the layout object 144 is completed, the result of the processing may be passed onto a task in the main thread. For example, in FIG. 2, when the processing of the layout objects 144 are completed, their results may be passed onto task 212-m. In some embodiments, task 212-m displays a user interface based on the outcome of processing the layout objects 144.

In some embodiments, processing of tasks by the background threads 220 is paused and control of the application module is returned to the main thread. When the processing of tasks by the background threads 220 is paused, the ongoing tasks in the background threads 220 are paused and awaiting resumption. When the main thread 210 regains control, one or more tasks 212 in the main thread 210 are processed. For example, when the main thread 210 regains control, the tasks 212 that are the high-priority tasks, non-completion of which hinders the user experience, are processed first. When the tasks on the main thread 210 are completed, control is returned to the background threads 220, and the processing at the background threads 220 is resumed.

In some embodiments, the tasks on the main thread 210 are repeated. For example, steps of receiving a user input, processing the user input, preparing an updated user interface, and displaying the updated user interface are repeated while the application module is being executed. In some embodiments, one or more processes in the background threads are also repeated while the application module is being executed.

In some embodiments, the main thread 210 is executed on a first processor and the one or more background threads 220 are executed on one or more processors distinct from the first processor (e.g., a second processor).

FIG. 3 is a block diagram illustrating display objects in accordance with some embodiments. Shown in FIG. 3 are a layer object 150, one or more view objects 148, and one or more node objects 144 (also called herein layout objects) of an application module. The layer object 150 represents a display layer. In some embodiments, the layer object 150 includes information about visual content selected for display in the display layer. In some embodiments, the layer object 150 includes information about visual attributes of the display layer, such as color and borderline shapes. In some embodiments, the layer object 150 includes information about its content (e.g., size, position, rotation of each content item).

View object(s) 148 represent regions of a user interface. In some embodiments, a view corresponds to a single user interface element, such as a button, a text box, etc. In some embodiments, a view includes multiple user interface elements.

In some embodiments, tasks related to the layer object 150 and the view object(s) 148 are required to be processed in the main thread of the application module (e.g., main thread 210, FIG. 2).

In some embodiments, node object(s) 144 are objects that are created to correspond to view objects 148. Tasks related to node object(s) 144 are not required to be processed on the main thread. Thus, nodes object(s) 144 are used to move tasks related to view objects 148 to background threads for processing.

In some embodiments, there are strong links from node objects 144 to view objects 148, and from view objects 148 to the layer object 150 (as indicated by the solid arrows in FIG. 3). That is, each node object 144 corresponds to a view object 148, and each view 148 corresponds to a layer object 150. In some embodiments, there are weak links from the layer object 150 to view objects 148, and from view objects 148 to node objects 144 (as indicated by the dashed arrows in FIG. 3). That is, not every layer object 150 has a view object 148, and not every view object 148 has a node object 144.

In some embodiments, the layer object 150 corresponds to one or more node objects 144 without corresponding to any view object 148.

In some embodiments, node objects 144 and view objects 148 have a one-to-one correspondence, examples of which are described below.

FIG. 4A is a block diagram illustrating a view hierarchy in accordance with some embodiments. At the top level of the view hierarchy in FIG. 4A is View 1 (402). View 1 (402) has child views: View 2 (404) and View 3 (406). View 3 (406) also has child views: View 4 (408) and View 5 (410).

The views 402, 404, 406, 408, and 410 correspond to elements of displayed content (e.g., user interface elements of a user interface). For example, in the user interface of the social network application module 140, a unit element is an entry (e.g., posting in a social network system), and View 1 (402) corresponds to the entry. Elements subordinate to the entry correspond to descendent views 404, 406 408, and 410 of View 1 (402).

FIG. 4B is a block diagram illustrating a node hierarchy that corresponds to the view hierarchy in FIG. 4A. As described above, in some embodiments, nodes and views have a one-to-one correspondence. Thus, the node hierarchy in FIG. 4B has the same structure as the view hierarchy in FIG. 4A. At the top level of the node hierarchy in FIG. 4B is Node 1 (412), which corresponds to the View 1 (402). Node 1 (412) has child nodes: Node 2 (414), which corresponds to View 2 (404), and Node 3 (416), which corresponds to View 3 (406). Node 3 (416) has child nodes: Node 4 (418), which corresponds to View 4 (408), and Node 5 (420), which corresponds to View 5 (410).

Figure 5A:
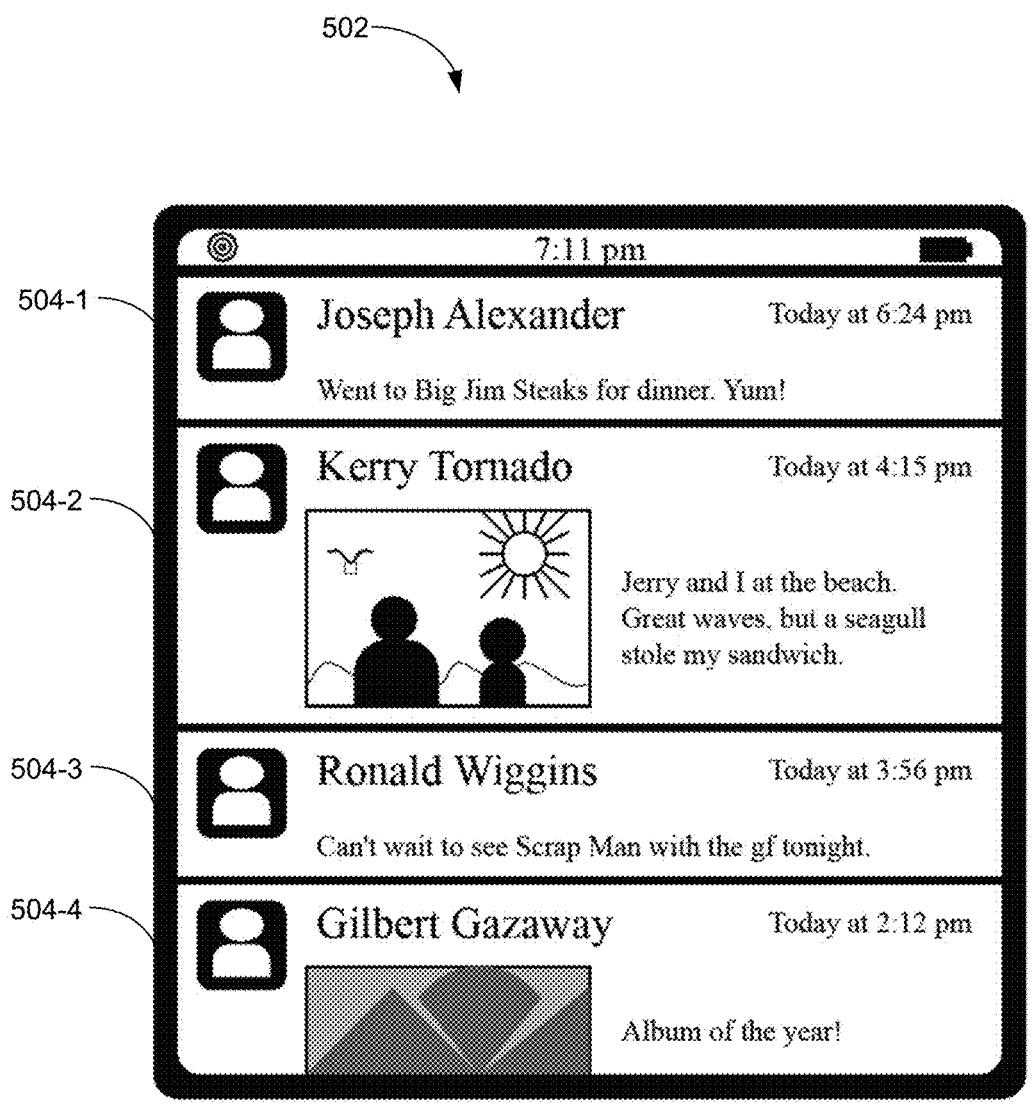
FIG. 5A illustrates an exemplary user interface of an application program in accordance with some embodiments.

FIG. 5A illustrates an exemplary user interface of an application program in accordance with some embodiments. As shown in FIG. 5A, a device 502 (e.g., device 100, FIG. 1) is displaying a user interface of an application program for a user. The device 502 is operative to execute one or more applications on behalf of a user, including first-party applications, third-party applications, application provided with the device 502, and applications installed by one or more users of the device 502.

As shown in FIG. 5A, the device 502 displays a user interface of an application for a social networking service, including postings in the social networking service (e.g., social network client module 140, FIG. 1). The posting include one or more entries. In FIG. 5A, four entries are shown: entry 504-1 regarding a friend going to dinner, entry 504-2 regarding a friend posting a commented photo of a trip to the beach, entry 504-3 regarding a friend posting about going to a concert, and entry 504-4 regarding a friend posting that they like a particular music album with an associated comment.

In some embodiments, each of the entries corresponds to a set of user interface elements received from a server (e.g., a server of the social networking service).

Figure 5B:
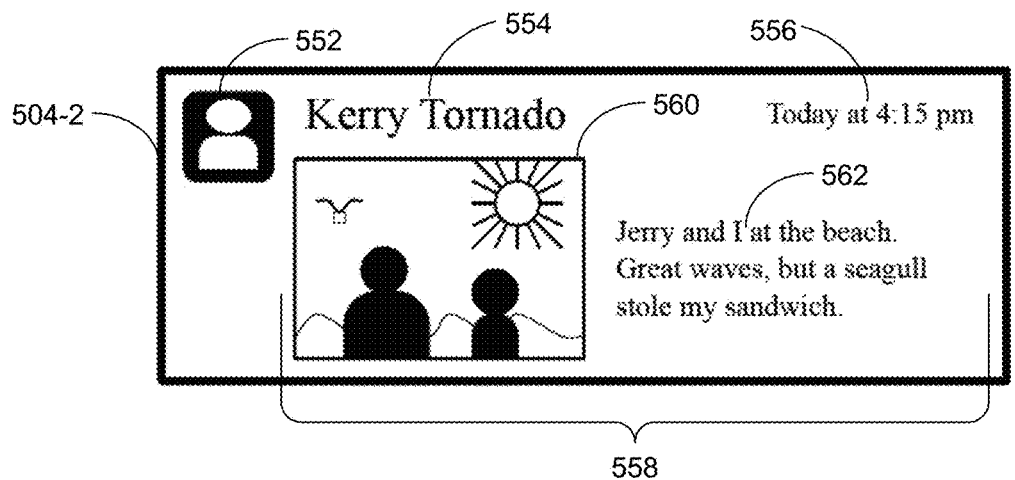
FIG. 5B illustrates a set of user interface elements in accordance with some embodiments.

FIG. 5B illustrates a set of user interface elements in accordance with some embodiments. FIG. 5B illustrates that the entry 504-2 (FIG. 5A) includes multiple user interface elements. As described above with reference to FIG. 5A, the entry 504-2 is a posting by a friend (e.g., a user connected with a user of the electronic device 100 in the social network system) of a commented picture of a trip to the beach. The user interface elements of the entry 504-2 include a name user interface element 554 (e.g., the name "Kerry Tornado" of the friend), an icon user interface element 552 (e.g., an avatar or a profile photo thumbnail of the friend), a time user interface element 556 (e.g., the date and time of the entry 504-2), and content user interface element 558 (e.g., any photo and/or text posted by the friend). In FIG. 5B, the content user interface element 558 includes a photo user interface element 560 (e.g., the photo posted by the friend) and text user interface element 562 (e.g., the comment, posted by the friend, accompanying the photo user interface element 560).

Figure 5C:
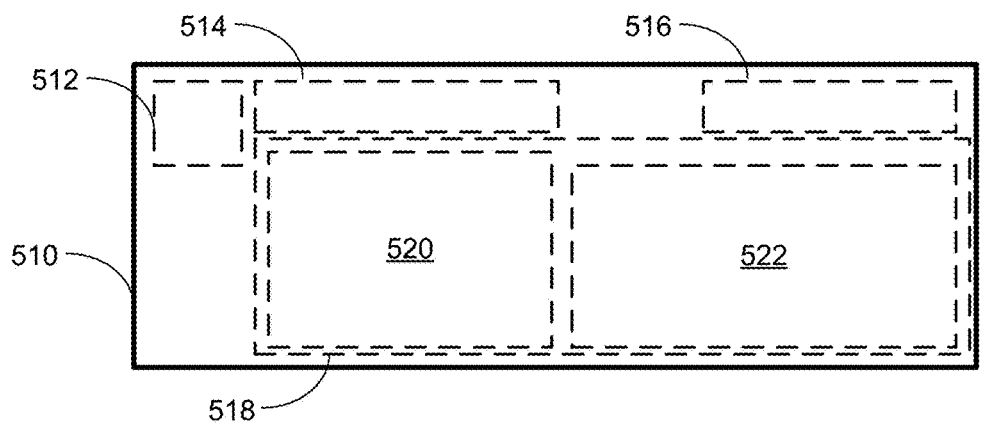
FIG. 5C illustrates views corresponding to the set of user interface elements in FIG. 5B in accordance with some embodiments.

FIG. 5C illustrates views corresponding to the set of user interface elements in FIG. 5B in accordance with some embodiments. FIG. 5C illustrates a view 510, which corresponds to the entry 504-2 as a whole. In some embodiments, as shown in FIG. 5C, views can be nested. Within the view 510 are views 512, 514, 516, 518, 520, and 522. The view 512 corresponds to the icon user interface element 552. The view 514 corresponds to the name user interface element 554. The view 516 corresponds to the time user interface element 556. The view 518 corresponds to the content user interface element 558. Each of these views, shown in FIG. 5C, defines a region of a user interface within which a corresponding user interface element is displayed. For example, the view 512 is located in the top left corner of the view 510, and correspondingly, the icon user interface element 552 is located in the top left corner of the entry 504-2. Within the view 518 are view 520, which corresponds to the photo user interface element 560, and a view 522, which corresponds to the text user interface element 562. The views 520 and 522 define their regions within the view 518, and correspondingly the locations of the photo user interface element 560 and the text user interface element 562 within the content user interface element 558. The nesting of the views 512, 514, 516, and 518 within view 510, and the nesting of views 520 and 522 within view 518, corresponds to a hierarchy of the views, which is illustrated in FIG. 5D and described below.

Figure 5D:
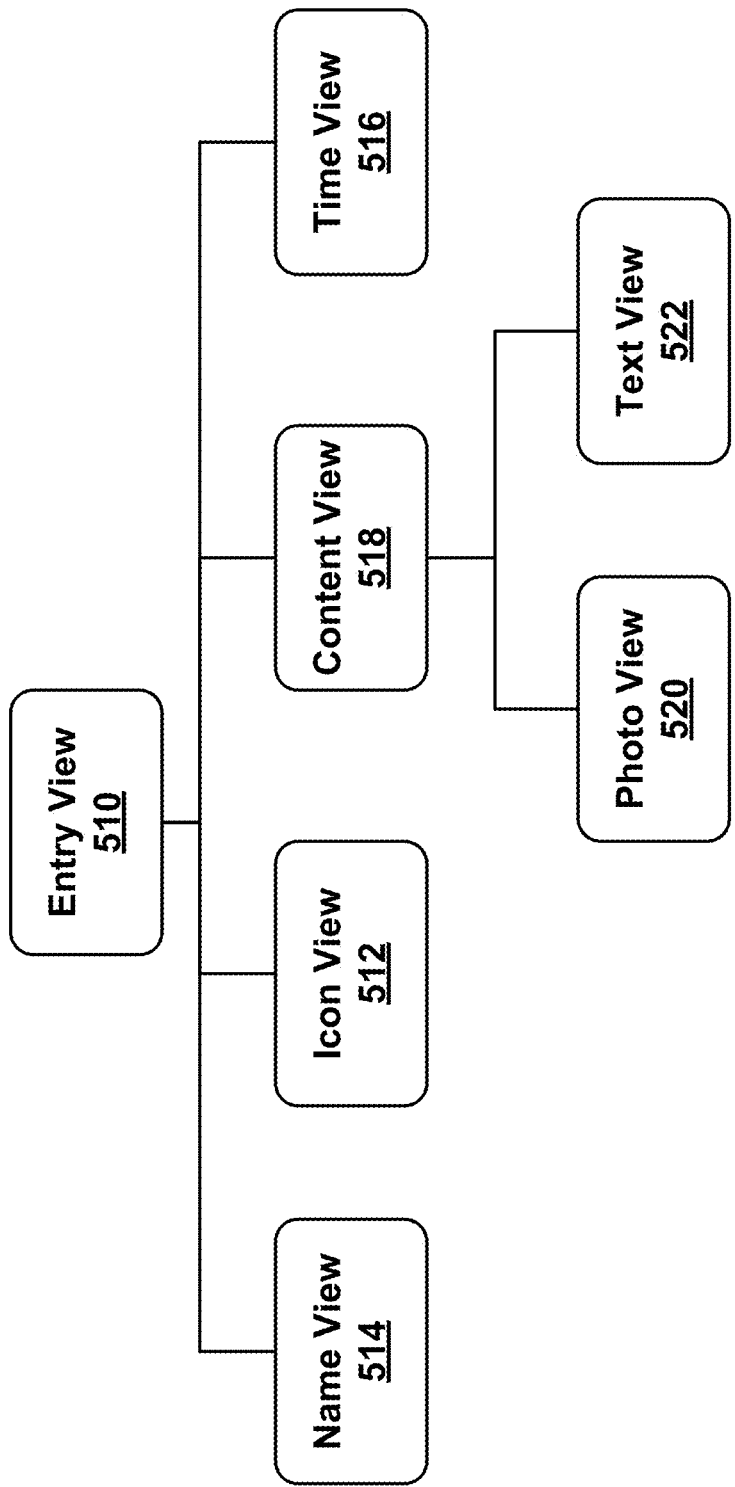
FIG. 5D is a block diagram illustrating an exemplary view hierarchy of the views in FIG. 5C in accordance with some embodiments.

FIG. 5D is a block diagram illustrating an exemplary view hierarchy of the views in FIG. 5C in accordance with some embodiments. FIG. 5D illustrates a view hierarchy, of the views corresponding to the user interface elements of entry 504-2, as a tree structure. At the top level of the view hierarchy is the entry view 510, which corresponds to entry 504-2 as a whole, as described above. Immediate child views of the view 510 include the icon view 512, the name view 514, the time view 516, and the content view 518, which correspond to the icon user interface element 552, the name user interface element 554, the time user interface element 556, and the content user interface element 558, respectively, as described above. The content view 518 has child views: the photo view 520 and the text view 522, which correspond to the photo user interface element 560 and the text user interface element 562, respectively, as described above.

Figure 5E:
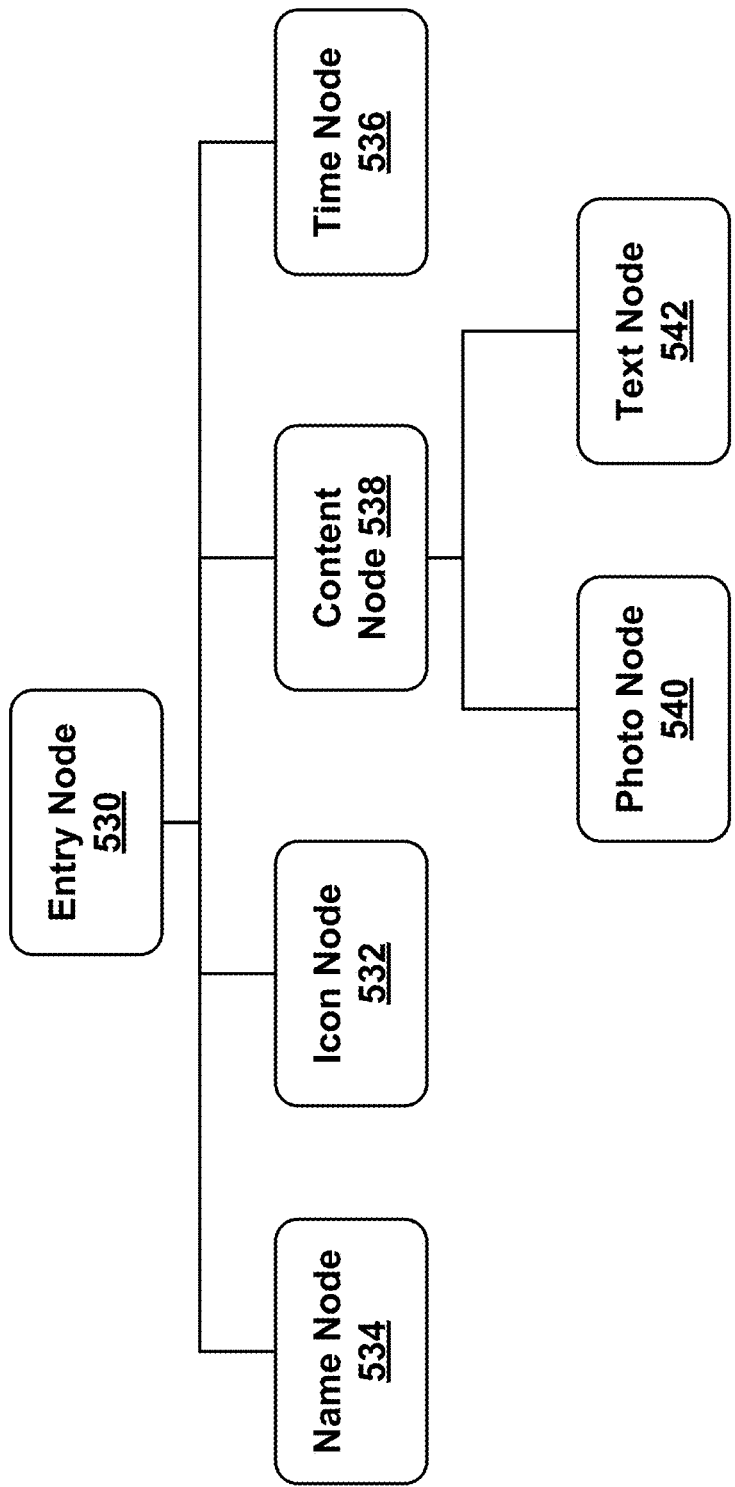
FIG. 5E is a block diagram illustrating an exemplary node hierarchy that corresponds to the view hierarchy in FIG. 5D.

FIG. 5E is a block diagram illustrating an exemplary node hierarchy that corresponds to the view hierarchy in FIG. 5D in accordance with some embodiments. Each node in the node hierarchy has a one-to-one correspondence to a view in the view hierarchy in FIG. 5E. Thus, the node hierarchy has the same tree structure as the view hierarchy. At the top level of the node hierarchy is an entry node 530, which corresponds to the entry view 510, and thus corresponds also to the entry 504-2 as a whole. Immediate children of the entry node 530 include an icon node 532, a name node 534, a time node 536, and a content node 538. The name node 534 corresponds to the name view 514, and thus also corresponds to the name user interface element 554. The icon node 532 corresponds to the icon view 512, and thus also corresponds to the icon user interface element 552. The time node 536 corresponds to the time view 516, and thus also corresponds to the time user interface element 556. The content node 538 corresponds to the content view 518, and thus also corresponds to the content user interface element 558. The content node 538 has child nodes: a photo node 540 and a text node 542. The photo node 540 corresponds to the photo view 520, and thus also corresponds to the photo user interface element 560. The text node 542 corresponds to the text view 522, and thus also corresponds to the text user interface element 562.

FIG. 6 is a timing diagram illustrating multi-threaded operations in accordance with some embodiments. FIG. 6 illustrates a timeline divided into equal intervals 610. Each interval 610 corresponds to an amount of time available within a frame. For a frame rendering at a frequency or refresh rate of X frames per second (i.e., X hertz), the interval 610 corresponds to 1/X seconds or less.

In some embodiments, 60 frames per second (i.e., X=60) is used. A user may perceive a decrease from 60 frames per second as a delay in rendering the user interface of the application.

Multiple tasks 612 are performed within an interval 610. Tasks 612 can include background tasks, tasks for processing user input, and tasks for updating a display of a user interface. For example, task 612-1 is a user interface updating task, task 612-2 is a user input processing task, and task 612-3 is a background task. In some embodiments, tasks 612 within an interval 610 include one or more tasks on the main thread and one or more tasks on background threads.

In some embodiments, timing allocated for the tasks varies from interval to interval. For example, the user input processing task in one interval may take longer than the user input processing task in another interval. Similarly, the user interface updating task in one interval may take less time than the user interface updating task in another interval. A remaining time in each interval is allocated for background tasks.

In some embodiments, in order to maintain the desired frame rate, processing of tasks in the background threads is paused and control is given to the main thread, at which time the main thread can process at least some tasks. The background threads are paused in accordance with a determination that one or more predefined criteria are satisfied. In some embodiments, the background threads are paused at every interval 610 (e.g., every 1/X seconds when the predefined criteria include pausing at every 1/X seconds). Thus, for a frame rate of 60 frames per second, the background threads are paused approximately every 16.7 milliseconds (16.7 ms≈1/X seconds for X=60).

FIGS. 7A-7B are flow diagrams illustrating a method of processing tasks using multiple threads on an electronic device (e.g., electronic device 100, such as a smart watch, a smart phone, or a tablet) in accordance with some embodiments. FIGS. 7A-7B correspond to instructions stored in a computer memory or computer readable storage medium (e.g., memory 106).

The device processes (701) tasks in an application program. For example, as shown in FIG. 2, one or more tasks 212 (e.g., updating a user interface and processing a user input) are processed.

In some embodiments, the device processes (702) tasks in an application program on a main thread. For example, the one or more tasks 212 in FIG. 2 are processed in the main thread 210 of an application module.

The device at least partially processes (703) a plurality of layout objects in the application program. In some embodiments, one or more layout objects are processed in a main thread.

In some embodiments, the device at least partially processes (704) a plurality of layout objects in the application program on one or more background threads, distinct from the main thread. As shown in FIG. 2, for example, one or more layout objects 144 are processed in one or more background threads 220 distinct from the main thread 210. In some embodiments, the plurality of layout objects is fully processed on the one or more background threads during a single time interval. However, in some embodiments, the plurality of layout objects is only partially processed on the one or more backgrounds during a single time interval due to the limited time provided to the one or more background threads. In such instances, the unprocessed portion in processing the plurality of layout objects is further processed when control is subsequently given back to the one or more background threads.

In some embodiments, processing the plurality of layout objects in the application program on one or more background threads includes determining (706) layout parameters for the plurality of layout objects (e.g., for a respective layout object, determining a size and a position of a corresponding user interface element on the display). For example, processing the layout objects corresponding to user interface elements 552, 554, 556, 558, 560, 562 in the background threads includes determining sizes and positions of the user interface elements 552, 554, 556, 558, 560, 562. In some embodiments, processing the layout objects in the application program on one or more background threads includes decoding an encoded image (e.g., decompressing a JPEG image).

In accordance with a determination that one or more predefined control criteria are satisfied, the device pauses (707) the processing of the plurality of layout objects in the application program. For example, the device executes a predefined delay instruction in the main thread 210 is reached and pauses execution of a subsequent set of instructions associated with the predefined delay instruction (e.g., schedules execution of the set of instructions associated with the predefined delay instruction at a next turn of a runloop).

In some embodiments, in accordance with a determination that one or more predefined background-thread-to-main-thread-control criteria are satisfied (e.g., based on a predefined time interval, a predefined number of tasks on the main thread, etc.), the device pauses (708) the processing of the plurality of layout objects in the application program on the one or more background threads and gives control of processing the application program to the main thread. The device determines which thread in the application program is currently being executed by the one or more processors. For example, while control is given to the main thread, the one or more processors execute the main thread in the application program. In some embodiments, while the one or more processors are executing the main thread, the one or more background threads are paused (or suspended). While control is given to a respective background thread, the one or more processors execute the respective background thread. In some embodiments, while the one or more processors are executing the respective background thread, the main thread and the one or more background threads, other than the respective background thread, are paused (or suspended).

For example, when the predefined background-thread-to-main-thread-control criteria are satisfied, processing on the background threads 220 is paused, and control is given to the main thread 210. When processing on the background threads 220 are paused, processing of the layout objects 144 are paused.

In some embodiments, pausing the processing of the plurality of layout objects on the one or more background threads includes injecting a delay in the plurality of layout objects. In some embodiments, pausing the processing of the plurality of layout objects on the one or more background threads includes injecting a low priority instruction (e.g., a NOP instruction) or a delay instruction (e.g., a performSelector:afterDelay instruction) in the plurality of layout objects. For example, a delay instruction with a zero delay setting is included in a set of instructions, and the device pauses execution of the set of instructions until a next turn to process the set of instructions. In some embodiments, pausing the processing of the plurality of layout objects on the one or more background threads includes sending instructions to suspend the processing of the plurality of layout objects to the one or more background threads. In some embodiments, the delay instruction is included in multiple locations in the application program. This groups instructions in the application program into several chunks, and the delay instructions serve as positions in the application program where the device can pause execution of the instructions in the application program.

In some embodiments, the processing of the plurality of layout objects is paused based on a thread control value included in the application program (710). In some embodiments, in accordance with a determination that the thread control value included in the application program corresponds to a first predefined value, the electronic device pauses the processing of the plurality of layout objects on the one or more background threads and gives control to the main thread. In some embodiments, in accordance with a determination that the thread control value included in the application program does not correspond to the first predefined value, the electronic device foregoes pausing the processing of the plurality of layout objects on the one or more background threads and giving control to the main thread. An exemplary thread control value is 1. For example, in accordance with a determination that the thread control value in the application program is set to 1, the processing of the plurality of layout objects is paused. In accordance with a determination that the thread control value in the application program is not 1, the processing of the plurality of layout objects is not paused. In another example, as shown in FIGS. 1-2, layout object 144-1, processed on the background thread 220-1, has a thread control value 146. If the thread control value 146 is 1, the processing of layout object 144-1 on the background thread 220-1 is paused (when the rest of the predefined background-thread-to-main-thread-control criteria are satisfied) and control is given to the main thread 210.

In some embodiments, the predefined background-thread-to-main-thread-control criteria include a predefined time interval (712). This allows control to be given to the main thread at the predefined time interval so that time-critical tasks (e.g., updating the user interface and processing a user input) are timely handled. For example, as described above with reference to FIG. 6, the main thread is given control every 1/X seconds (e.g., at least every 16.7 milliseconds), where X is the value of the desired refresh rate.

In some embodiments, the display is refreshed at a predefined rate, and the predefined time interval corresponds to one refresh cycle or less at the predefined rate (714). In some embodiments, the predefined time interval is a reciprocal of the predefined rate. For example, for the predefined rate of 60 Hz, the predefined time interval is 16.7 milliseconds or less (16.7 milliseconds≈1/(60 Hz)=1/X seconds for X=60). Setting the predefined time interval less than a reciprocal of the frame rate (e.g., 15 milliseconds, which is less than 16.7 milliseconds for 60 Hz), ensures that control is given to the main thread at the predefined time interval or less so that time-critical tasks are timely handled despite additional delays (e.g., delays in the operating system).

In some embodiments, the predefined background-thread-to-main-thread-control criteria include the thread control value included in the application program and the predefined time interval. For example, if the thread control value is not the first predefined value as described above (i.e., is not the predefined value that indicates pausing), the background threads are not paused even if the predefined time interval is reached.

While the processing of the plurality of layout objects in the application program is paused, the device processes (715) system tasks. For example, the device processes user inputs (e.g., touch inputs) and/or processes a timer-based operation (e.g., physics-simulating animations).

In some embodiments, while the main thread has control of processing the application program, the device processes (716) at least a subset of tasks in the application program on the main thread. For example, while the background threads 220 are paused, at least some of the tasks 212 are processed on the main thread 210 (e.g., processing a user input).

In some embodiments, the subset of tasks in the application program includes processing a user input (718). For example, a user input on a touch-sensitive surface is processed (e.g., coordinates of the user input are calculated, a user interface element that corresponds to the user input is identified, and/or one or more operations that correspond to the user input are identified and initiated for execution, such as zoom, pan, and/or rotate operations). For example, as described above with reference to FIG. 6, within an interval 610 is a user input processing task 612-2. The task 612-2 is processed when the main thread is given control after a pause of the background threads.

In some embodiments, the subset of tasks in the application program includes updating a display of a user interface in the application program (720). For example, as described above with reference to FIG. 6, tasks performed within an interval 610 include a task 612-1 for updating a display of a user interface. The task 612-1 is processed when the main thread is given control after a pause of the background threads.

After processing the system tasks while the processing of the plurality of layout objects in the application program is paused, the device resumes (721) the processing of the plurality of layout objects. In some embodiments, the processing of the plurality of layout objects is resumed at a next turn of a runloop.

In some embodiments, after processing at least the subset of tasks in the application program on the main thread while the main thread has control of processing the application program, the device resumes (722) the processing of the plurality of layout objects on the one or more background threads. For example, after the main thread 210 processes at least some of the tasks 212 (e.g., the high priority tasks, such as processing user input and updating the display of the user interface), control is given back to the background threads 220, and processing of the tasks in the background threads (e.g., the layout objects 144) are resumed.

In some embodiments, the device processes (724) a plurality of view objects in the application program on the main thread. A hierarchy of the plurality of view objects is identical to a hierarchy of the plurality of layout objects and each view object of the plurality of view objects corresponds to a respective layout object of the plurality of layout objects. For example, view objects 148 (e.g., views 402, 404, 406, 408, 410 (FIG. 4A)) are processed on the main thread 210. Each view objects 148 corresponds to a respective layout object 144 (e.g., node objects 412, 414, 416, 418, 420 (FIG. 4B)) and the layout objects 144 have the same hierarchy as the corresponding view objects 148. Having the same hierarchy between the view objects and the layout objects facilitates management of the background threads.

In some embodiments, the plurality of view objects in the application program is not configured for processing on any background thread (726). In some embodiments, the plurality of view objects in the application program is prevented from processing on any background thread. In other words, the plurality of view objects is configured for processing on the main thread, rather than a background thread. For example, view objects 148 are required by the operating system 126 to be processed in the main thread 210. Thus, node objects (e.g., layout objects 144) are used for the corresponding view objects 148. Nodes (and layout objects 144) are not required to be processed in the main thread.

Thus, at least some tasks related to the view objects 148 can be processed on background threads 220.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A non-transitory computer-readable storage medium, storing one or more programs for execution by one or more processors of an electronic device, the one or more programs including instructions for:
   processing tasks in an application program on a first thread;
   creating, by the first thread, one or more additional threads distinct from the first thread;
   partially processing a plurality of layout objects in the application program on the one or more additional threads;
   in accordance with a determination that the application program requires processing of a predetermined number of high-priority tasks based on a thread-control value included in the application program, pausing the processing of the plurality of layout objects in the application program on the one or more additional threads and giving control of processing the application program to the first thread;
   while the processing of the plurality of layout objects in the application program on the one or more additional threads is paused, processing the high-priority tasks in the application program on the first thread; and,
   after processing the high-priority tasks on the first thread while the processing of the plurality of layout objects in the application program on the one or more additional threads is paused, resuming the processing of the plurality of layout objects on the one or more additional threads.

2. The computer-readable storage medium of claim 1, the one or more programs including instructions for processing a plurality of view objects in the application program on the first thread, wherein a hierarchy of the plurality of view objects is identical to a hierarchy of the plurality of layout objects and each view object of the plurality of view objects corresponds to a respective layout object of the plurality of layout objects.

3. The computer-readable storage medium of claim 2, wherein the plurality of view objects in the application program is not configured for processing on any of the one or more additional threads.

4. The computer-readable storage medium of claim 1, wherein the instructions for processing the plurality of layout objects include instructions for determining layout parameters for the plurality of layout objects.

5. The computer-readable storage medium of claim 1, wherein the instructions for processing the high-priority tasks include instructions for processing a user input.

6. The computer-readable storage medium of claim 1, wherein the instructions for processing the high-priority tasks include instructions for updating a display of a user interface in the application program.

7. A method, comprising:
   at an electronic device with a display, one or more processors, and memory storing one or more programs for execution by the one or more processors:
   processing tasks in an application program on a first thread;
   creating, by the first thread, one or more additional threads distinct from the first thread;
   partially processing a plurality of layout objects in the application program on the one or more additional threads;
   in accordance with a determination that the application program requires processing of a predetermined number of high-priority tasks based on a thread-control value included in the application program, pausing the processing of the plurality of layout objects in the application program on the one or more additional threads and giving control of processing the application program to the first thread;
   while the processing of the plurality of layout objects in the application program on the one or more additional threads is paused, processing the high-priority tasks in the application program on the first thread; and,
   after processing the high-priority tasks on the first thread while the processing of the plurality of layout objects in the application program on the one or more additional threads is paused, resuming the processing of the plurality of layout objects on the one or more additional threads.

8. The method of claim 7, comprising processing a plurality of view objects in the application program on the first thread, wherein a hierarchy of the plurality of view objects is identical to a hierarchy of the plurality of layout objects and each view object of the plurality of view objects corresponds to a respective layout object of the plurality of layout objects.

9. The method of claim 8, wherein the plurality of view objects in the application program is not configured for processing on any of the one or more additional threads.

10. The method of claim 7, wherein processing the plurality of layout objects in the application program on the one or more additional threads includes determining layout parameters for the plurality of layout objects.

11. The method of claim 7, wherein processing the high-priority tasks in the application program includes processing a user input.

12. The method of claim 7, wherein processing the high-priority tasks in the application program includes updating a display of a user interface in the application program.

13. An electronic device, comprising:
   a display,
   one or more processors, and
   memory storing one or more programs for execution by the one or more processors, the one or more programs including instructions for:
   processing tasks in an application program on a first thread;

creating, by the first thread, one or more additional threads distinct from the first thread;

partially processing a plurality of layout objects in the application program on the one or more additional threads;

in accordance with a determination that the application program requires processing of a predetermined number of high-priority tasks based on a thread-control value included in the application program, pausing the processing of the plurality of layout objects in the application program on the one or more additional threads and giving control of processing the application program to the first thread;

while the processing of the plurality of layout objects in the application program on the one or more additional threads is paused, processing the high-priority tasks in the application program on the first thread; and, after processing the high-priority tasks on the first thread while the processing of the plurality of layout objects in the application program on the one or more additional threads is paused, resuming the processing of the plurality of layout objects on the one or more additional threads.

14. The device of claim 13, the one or more programs including instructions for processing a plurality of view objects in the application program on the first thread, wherein a hierarchy of the plurality of view objects is identical to a hierarchy of the plurality of layout objects and each view object of the plurality of view objects corresponds to a respective layout object of the plurality of layout objects.

15. The device of claim 14, wherein the plurality of view objects in the application program is not configured for processing on any of the one or more additional threads.

16. The device of claim 13, wherein the instructions for processing the plurality of layout objects include instructions for determining layout parameters for the plurality of layout objects.

17. The device of claim 13, wherein the instructions for processing the high-priority tasks include instructions for processing a user input.

* * * * *